United States Patent [19]

Potter

[11] Patent Number: 5,714,098
[45] Date of Patent: Feb. 3, 1998

[54] FOOTWEAR FITTING METHOD

[75] Inventor: Daniel R. Potter, Forest Grove, Oreg.

[73] Assignee: Nike, Inc., Beaverton, Oreg.

[21] Appl. No.: 575,820

[22] Filed: Dec. 20, 1995

[51] Int. Cl.$^6$ .................................................. B29C 67/20
[52] U.S. Cl. ..................... 264/40.1; 12/142 R; 264/321; 264/322; 425/403
[58] Field of Search .................................. 12/145, 142 E, 12/146 D, 146 L, 146 W, 142 R; 264/521, 40.1, 296, 322, 292, 230, 223; 425/2, 403

[56] References Cited

U.S. PATENT DOCUMENTS

| | | |
|---|---|---|
| Re. 4,828 | 3/1872 | Mills . |
| Re. 29,041 | 11/1976 | Fukuoka . |
| 45,178 | 11/1864 | Rillot . |
| 59,715 | 11/1866 | Duchemin . |
| 73,546 | 1/1868 | Pease . |
| 123,116 | 1/1872 | Mills . |
| 124,280 | 3/1872 | Mills . |
| 273,108 | 2/1883 | Kingston . |
| 293,913 | 2/1884 | Reynolds . |
| 309,677 | 12/1884 | Yale . |
| 379,039 | 3/1888 | Adler . |
| 410,528 | 9/1889 | Koopman . |
| 486,607 | 11/1892 | Willey . |
| 841,732 | 1/1907 | Smith . |
| 888,149 | 5/1908 | Eastman . |
| 914,329 | 3/1909 | Bliss et al. . |
| 988,769 | 4/1911 | Griffin . |
| 1,088,274 | 2/1914 | Guth . |
| 1,364,468 | 1/1921 | Wilson . |
| 1,434,669 | 11/1922 | Baker . |
| 1,465,356 | 4/1923 | Gafner . |
| 1,510,286 | 9/1924 | McMonagle . |
| 1,565,057 | 12/1925 | Chappell . |
| 2,014,262 | 1/1935 | Messmer . |
| 2,037,915 | 2/1936 | Messmer . |
| 2,175,117 | 7/1939 | Hack et al. . |
| 2,597,197 | 5/1952 | Stacey . |
| 2,794,270 | 6/1957 | Dubner . |
| 3,032,792 | 5/1962 | Frank . |
| 3,091,042 | 5/1963 | Gilkerson . |
| 3,169,326 | 2/1965 | Butera . |
| 3,199,149 | 8/1965 | Croyle . |
| 3,325,919 | 6/1967 | Robinson . |
| 3,377,721 | 4/1968 | Johnson ................. 12/142 R |
| 3,496,584 | 2/1970 | Heath . |
| 3,555,588 | 1/1971 | Cooper . |
| 3,641,688 | 2/1972 | von den Benken . |
| 3,896,516 | 7/1975 | von den Benken ............ 12/142 R |
| 3,977,034 | 8/1976 | Brown .................... 12/142 R |
| 4,027,406 | 6/1977 | Salvatore . |
| 4,034,431 | 7/1977 | Fukuoka . |
| 4,120,064 | 10/1978 | Salomon ................ 12/142 R |

(List continued on next page.)

*Primary Examiner*—Jan H. Silbaugh
*Assistant Examiner*—Mark Eashoo
*Attorney, Agent, or Firm*—Banner & Witcoff, Ltd.

[57] ABSTRACT

A footwear fitting system employs a set of sample footwear items, e.g., shoes, provided in small increments of length and width. The sample shoes are tried on by the wearer and the one providing the best fit is chosen. Then, a fit component of a stock shoe is re-formed with a molding apparatus to provide a size and width identical to the selected sample shoe. A shoe store need only stock a relatively small number of standard size shoes in order to provide the wearer with a close "custom" fit. The footwear interior is re-formed by mounting the footwear on a last having a length and width corresponding to that of the selected sample shoe. The last is heated to the softening temperature of a moldable strip of material, e.g., ethylene vinyl acetate (EVA), incorporated into the shoe upper, then allowed to cool, whereby the footwear interior shape and size is reformed to correspond to the last. In an alternative embodiment, the footwear item is a shoe insert, e.g., a shoe insole. In a similar manner, the wearer is fitted to one of a set of sample shoe inserts. Then a stock insert is re-formed by molding to correspond in size and shape to the sample shoe insert providing the desired fit characteristics.

18 Claims, 7 Drawing Sheets

U.S. PATENT DOCUMENTS

| | | |
|---|---|---|
| 4,150,455 | 4/1979 | Fukuoka . |
| 4,286,348 | 9/1981 | White, Sr. . |
| 4,428,089 | 1/1984 | Dawber et al. . |
| 4,463,761 | 8/1984 | Pols et al. . |
| 4,510,636 | 4/1985 | Phillips . |
| 4,520,581 | 6/1985 | Irwin et al. . |
| 4,674,206 | 6/1987 | Lyden . |
| 4,703,533 | 11/1987 | Barma . |
| 4,770,648 | 9/1988 | Gillis . |
| 4,813,157 | 3/1989 | Boisvert et al. . |
| 4,841,648 | 6/1989 | Shaffer et al. . |
| 4,858,340 | 8/1989 | Pasternak . |
| 4,868,945 | 9/1989 | DeBettignies . |
| 4,897,938 | 2/1990 | Otsuka . |
| 5,054,147 | 10/1991 | Motsch . |
| 5,060,402 | 10/1991 | Rosen . |
| 5,101,580 | 4/1992 | Lyden . |
| 5,136,746 | 8/1992 | Jones . |
| 5,203,793 | 4/1993 | Lyden . |
| 5,339,252 | 8/1994 | White et al. . |
| 5,358,394 | 10/1994 | Riecken ........................ 264/223 |
| 5,387,384 | 2/1995 | Irving ........................... 264/223 |

FIG. 3 STORAGE FOR SHOE SIZING SAMPLES

| LENGTH / WIDTH | 6 | 6¼ | 6½ | 6¾ | 7 | 7¼ | 7½ | 7¾ | 8 | 8¼ | 8½ | 8¾ | 9 | 9¼ | 9½ | 9¾ | 10 | 10¼ | 10½ | 10¾ | 11 | 11¼ |
|---|---|---|---|---|---|---|---|---|---|---|---|---|---|---|---|---|---|---|---|---|---|---|
| C |  |  |  |  |  |  |  |  |  |  |  |  |  |  |  |  |  |  |  |  |  |  |
| D |  |  |  |  |  |  |  |  |  |  |  |  |  |  |  |  |  |  |  |  |  |  |
| E |  |  |  |  |  |  |  |  |  |  |  |  |  |  |  |  |  |  |  |  |  |  |
| EE |  |  |  |  |  |  |  |  |  |  |  |  |  |  |  |  |  |  |  |  |  |  |

| LENGTH / WIDTH | 11½ | 11¾ | 12 | 12¼ | 12½ | 12¾ | 13 | 13¼ | 13½ | 14 | 14½ | 15 | 15½ | 16 | 16½ | 17 | 17½ | 18 | 18½ | 19 | 19½ | 20 |
|---|---|---|---|---|---|---|---|---|---|---|---|---|---|---|---|---|---|---|---|---|---|---|
| C |  |  |  |  |  |  |  |  |  |  |  |  |  |  |  |  |  |  |  |  |  |  |
| D |  |  |  |  |  |  |  |  |  |  |  |  |  |  |  |  |  |  |  |  |  |  |
| E |  |  |  |  |  |  |  |  |  |  |  |  |  |  |  |  |  |  |  |  |  |  |
| EE |  |  |  |  |  |  |  |  |  |  |  |  |  |  |  |  |  |  |  |  |  |  |

(11)

FIG. 4 MOLD CORE (LAST) STORAGE

| LENGTH / WIDTH | 6 | 6¼ | 6½ | 6¾ | 7 | 7¼ | 7½ | 7¾ | 8 | 8¼ | 8½ | 8¾ | 9 | 9¼ | 9½ | 9¾ | 10 | 10¼ | 10½ | 10¾ | 11 | 11¼ |
|---|---|---|---|---|---|---|---|---|---|---|---|---|---|---|---|---|---|---|---|---|---|---|
| C | X | X | X | X | X | X | X | X | X | X | X | X | X | X | X | X | X | X | X | X | X | X |
| D | X | X | X | X | X | X | X | X | X | X | X | X | X | X | X | X | X | X | X | X | X | X |
| E | X | X | X | X | X | X | X | X | X | X | X | X | X | X | X | X | X | X | X | X | X | X |
| EE | X | X | X | X | X | X | X | X | X | X | X | X | X | X | X | X | X | X | X | X | X | X |

| LENGTH / WIDTH | 11½ | 11¾ | 12 | 12¼ | 12½ | 12¾ | 13 | 13¼ | 13½ | 14 | 14½ | 15 | 15½ | 16 | 16½ | 17 | 17½ | 18 | 18½ | 19 | 19½ | 20 |
|---|---|---|---|---|---|---|---|---|---|---|---|---|---|---|---|---|---|---|---|---|---|---|
| C | X | X | X | X | X | X | X | X | X | X | X | X | X | X | X | X | X | X | X | X | X | X |
| D | X | X | X | X | X | X | X | X | X | X | X | X | X | X | X | X | X | X | X | X | X | X |
| E | X | X | X | X | X | X | X | X | X | X | X | X | X | X | X | X | X | X | X | X | X | X |
| EE | X | X | X | X | X | X | X | X | X | X | X | X | X | X | X | X | X | X | X | X | X | X |

FOOTWEAR FITTING METHOD

BACKGROUND OF THE INVENTION

The present invention relates to footwear, and in particular to systems and methods used to fit footwear, e.g., shoes, to a wearer.

Prior to the Industrial Revolution and the advent of mass production, shoemaking was necessarily a labor intensive manual process requiring a skilled shoemaker, i.e., a cobbler. The basic process by which a cobbler would fit a shoe involved taking measurements of a wearer's foot, altering the shape and size of a standard size last to correspond to the measurements (e.g., by tacking material such as leather or putty onto the last), then forming the shoe upper and sole about the modified last. The traditional manual shoemaking technique is capable of producing a close custom fit. However, manual shoemaking requires a high degree of skill to produce a good result; it is also labor intensive and costly.

Today, of course, most shoes are manufactured in factories in mass quantities and shipped to stores that stock each shoe in standard sizes. At the store, the length and width of the wearer's foot is measured to determine a nominal foot size. This is typically performed with a conventional Brannock shoe measurement tray. Such devices measure the length of the foot in half size increments, e.g., from size 1 to size 15½. Each half size increment is equal to ⅙". Width designations are provided on a scale of letters incremented by ⅙", e.g., AAA, AA, A, B, C, D, E, EE, and EEE. Once the wearer's foot has been measured to determine a nominal size, the wearer will try on the desired shoe style in the measured length and width. If it is comfortable and seems to fit well, that size will be chosen. If it does not fit quite right, often other lengths and widths close to the measured length and width will be tried on to see if a better fit can be obtained.

A problem arises due to the fact that the standard ⅙" increments of length and width are not free enough to provide all wearers with a good fit. Additionally, often shoe stores will not have in stock, or even carry, all of the standard shoe sizes, i.e., combinations of standard shoe lengths and widths. In particular, it is common for shoe stores to reduce their inventory by carrying only a few widths for each length, and by carrying large sizes, e.g., size 14 length and above, in only full size increments. In such cases, the wearer can only choose the in-stock shoe that comes the closest to his/her size, i.e., the shoe that fits the best of the available choices. Moreover, shoes are conventionally sold in matched pairs, despite the fact that many persons have left and right feet differing by a half size or more in length and/or width. As a result, the conventional fitting technique provides an approximated fit that is typically less than ideal. A better fit could be obtained if footwear was offered in length increments finer than the present ⅙" increments, if stores could be counted on to carry all of the different standard lengths and widths, and if shoes were available in other than matched pairs. However, to offer such a range of sizes requires manufacturers to make, and retailers to stock, a very large number of shoes. This can result in substantial additional carrying costs and losses due to unsold stock, and may limit a store as to the types and styles of shoes that it can afford to offer.

In an effort to provide a better fit than is typically provided by the above standard fitting technique, without the necessity of increasing shoe stock, numerous approaches have been proposed for providing so-called custom fitted footwear. One approach involves the in-situ molding of the interior of a stock shoe in the shape of a wearer's foot. See, e.g., Dubner U.S. Pat. No. 2,794,270, Robinson U.S. Pat. No. 3,325,919, von den Benken U.S. Pat. No. 3,641,688, Dawber U.S. Pat. No. 4,428,089, and Pols et al. U.S. Pat. No. 4,463,761. Such methods generally require expensive equipment and footwear designs. Moreover, the in-situ molding of such systems requires that the wearer's foot be used as a mold form. This can be an unpleasant and time consuming process, e.g., many of the molding methods involve the injection of moldable (sometimes chemically reactive) material around the foot and/or the application of heat to the material surrounding the foot.

A further problem with in-situ shoe molding techniques is that they are generally limited to the formation of a shoe interior having a form corresponding directly to the shape of the foot. Such a close correspondence of shape may not result in the best fit for all wearers. For example, some wearers may prefer a relatively loose fit over a snug form-fit. Or, differences between the shoe interior shape and the wearer's foot may be desirable to compensate for foot problems, e.g., flat feet or tendencies to over-pronate or supinate. If after a custom footwear forming process is completed (based on a direct mold of the wearer's foot, or solely on measurements of the foot) the footwear is not comfortable to the user, the substantial time, effort and expense for performing the custom forming operation will have been wasted.

Another known approach for custom fitting footwear involves the selective placement of appropriately chosen shoe inserts. Such inserts may, e.g., be stock inserts adapted to better accommodate different foot girths, as disclosed in Otsuka U.S. Pat. No. 4,897,938. A fitting method involving the selection of an appropriate insert from a collection of stock inserts affords a degree of customization without increasing the number of shoe sizes that the retailer must stock. However, the retailer must maintain a stock of inserts of different types and sizes in addition to his normal shoe inventory.

Shoe inserts may also comprise moldable material and be designed from an impression of the wearer's foot. See, e.g., Phillips U.S. Pat. No. 4,510,636, Irwin et al. U.S. Pat. No. 4,520,581, DeBettignies U.S. Pat. No. 4,868,945 and Lyden U.S. Pat. Nos. 5,203,793; 5,101,580 and 4,674,206. This type of system requires that material be molded using the wearer's foot as a form, and thus has the disadvantages mentioned in connection with the in-situ shoe molding techniques mentioned above.

SUMMARY OF THE INVENTION

In view of the foregoing, it is a principal object of the present invention to provide a system and method for fitting footwear that avoid the drawbacks of the above-described prior art approaches.

It is a particular object of the present invention to provide a system and method for fitting footwear that allows custom on-site molding of a footwear interior, without requiring the use of the wearer's foot as a mold form.

Still another object of the present invention is to provide a system and method that can provide an excellent footwear fit based on a wearer's selection of footwear from a predetermined selection of sample footwear having different interior shapes and/or sizes, but which avoids the requirement for maintaining an inventory of footwear or footwear inserts corresponding in shape and/or size to the sample footwear.

Yet another object of the present invention is to provide a stock moldable footwear configuration, and a molding apparatus, well suited for use in a system and method as described above.

These and other objects are achieved in accordance with one aspect of the present invention by a footwear fitting system. The system includes a plurality of sample footwear items having different sizes and/or shapes corresponding to predetermined footwear interior sizes and/or shapes; a stock footwear item having a size and/or shape different from a selected one of the sample footwear items; and forming means for re-forming the stock footwear item such that it has substantially the same shape and size of said selected one of the sample footwear items.

In another aspect, the invention is embodied in a footwear fitting method. The method includes the steps of providing a plurality of sample footwear items having different sizes and/or shapes corresponding to predetermined footwear interior sizes and/or shapes; fitting a wearer to a selected one of the sample footwear items; providing a stock footwear item having a different shape and/or size than the selected one of the sample footwear items; and re-forming the stock footwear item such that it has substantially the same shape and size as the selected one of the sample footwear items.

In yet another aspect, the invention is embodied in moldable footwear for use in a fitting system. The footwear comprises a foot enclosure, and a moldable fit component attached within the foot enclosure and configured such that its thickness can be reduced by molding to alter an interior size and/or shape of the foot enclosure.

In still another aspect, the invention is embodied in a molding apparatus for use in a footwear fitting system. The molding apparatus comprises a footwear last; heating means for heating a working surface of the last; and a stand for removably supporting the footwear last such that footwear may be positioned on the last and re-formed by molding in accordance with a shape and size of the last.

These and other objects, features and advantages of the present invention will be readily apparent and fully understood from the following detailed description of the preferred embodiments, taken in connection with the appended drawings.

DETAILED DESCRIPTION OF THE PREFERRED EMBODIMENTS

Figure 1:
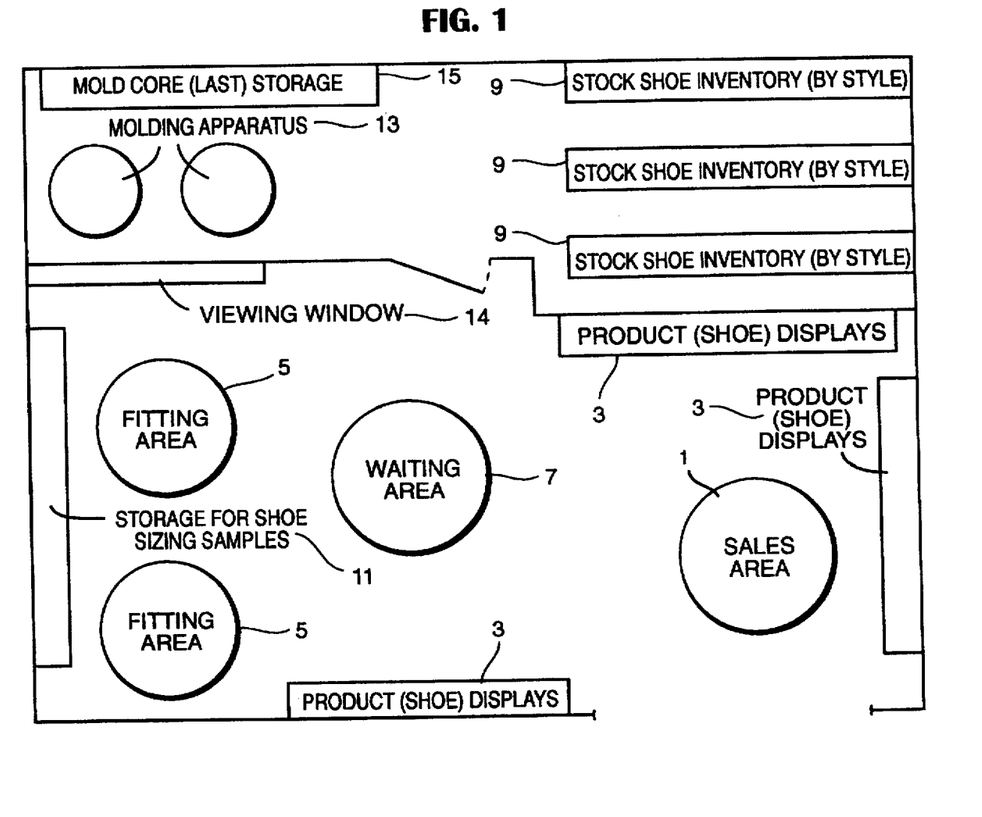
FIG. 1 is a diagrammatic top plan view of a store layout for implementing a fitting system in accordance with the present invention.

An overall footwear fitting system in accordance with the present invention is illustrated in the shoe store layout of FIG. 1. The layout includes a sales area 1, product (shoe) displays 3, fitting areas 5, and a waiting area 7. Provided in a stock-room is an inventory 9 of stock shoes arranged by style. Unlike conventional stock shoes, the stock shoes of the present invention incorporate a moldable fit-component. The fit component allows the shoes to be molded to lengths and widths differing from their original stock lengths and widths, and corresponding directly to the sizes of a collection of shoe sizing samples housed in a storage area 11 provided adjacent fitting areas 5. The sample shoes are used solely for sizing purposes. (In contrast, in the typical conventional fitting system, the customer tries on the same shoes that are sold to the public.) These shoes may (but need not) comprise the various style and design elements associated with the stock shoes that are actually sold.

Once it is determined which sample shoes provide the wearer with the best fit, i.e., the most desirable fit characteristics, it is determined whether stock shoe inventory 9 includes stock shoes in the sizes of the chosen sample shoes. If it does, then no molding is required. Assuming that it does not, stock shoes undersized with respect to the size of the selected sample shoes are chosen from the stock shoe inventory 9 and are re-formed by molding on a molding apparatus 13 (two shown). For safe observation of the molding process by the customer, apparatus 13 may be located in the retail store stock-room behind a customer viewing window 14. Alternatively, for economies of scale, the molding apparatus could be located at regional warehouses for handling the molding requirements of a number of retail stores.

Figure 4:
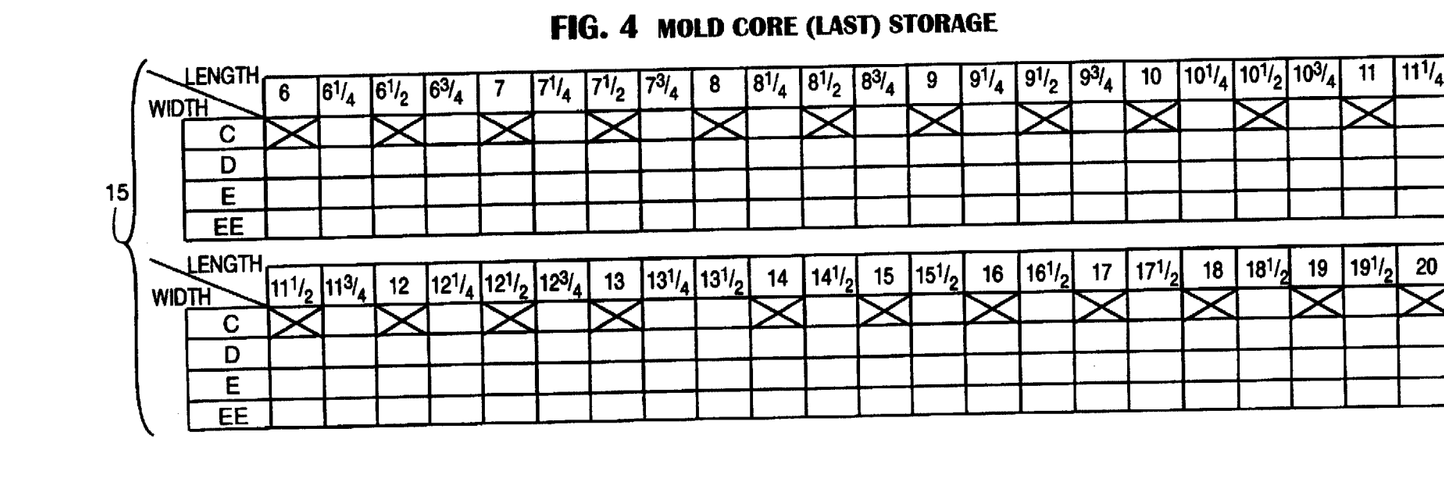
FIG. 4 is a diagrammatic side elevation view of the Mold Core (Last) Storage shown in FIG. 1.

Each apparatus 13 employs interchangeable mold cores (heatable lasts) corresponding in size and shape to the interiors of the sample shoes. To this end, the system may include a mold core (last) storage 15 including a separate last corresponding to each shoe sizing sample for which a corresponding stock shoe is not included in inventory 9. In the illustrated embodiment, inventory 9 includes the sizes shown in FIG. 2; as depicted by the X'ed through boxes in FIG. 4, it is thus unnecessary to include in mold core (last) storage 15 lasts having these sizes. Instead of a collection of separate lasts, a single last of adjustable size and/or shape could be utilized. See, e.g., McMonagle U.S. Pat. No. 1,510,286, Stacey U.S. Pat. No. 2,597,197 and Frank U.S. Pat. No. 3,032,792, all of which are hereby incorporated by reference.

Figure 2:
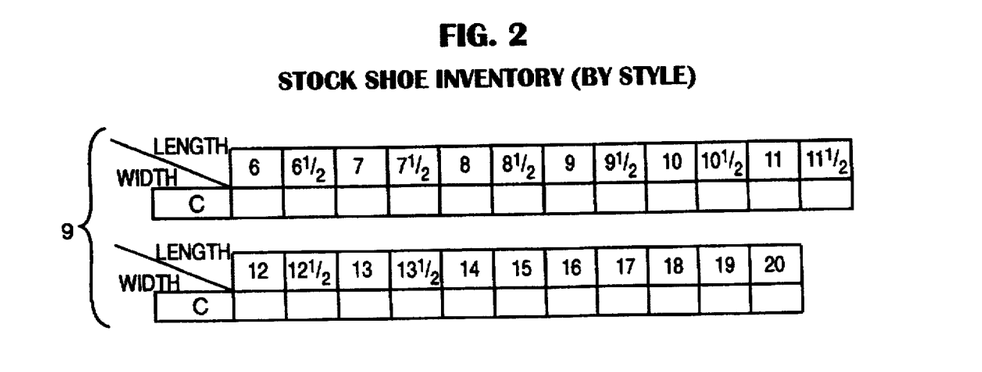
FIG. 2 is a diagrammatic side elevation view of the Stock Shoe Inventory (By Style) shown in FIG. 1.

Depending upon the particular sizing requirements and the moldability range of the stock shoes, it may be sufficient to provide an inventory of stock shoes having a single, or just a few, footwear sizes from which a range of size adjustments can be made. In the illustrated embodiment, to readily accommodate a majority of the population's foot sizes, the stock shoes are provided in relatively small (e.g., standard half size increments) over a wide range, e.g., from length size 6 to size 14, and in full size increments for length sizes between 14 and 20, as shown in FIG. 2. The stock shoes can all have the same width (e.g., "C", as shown), or have one or more different widths for each length.

Figure 3:
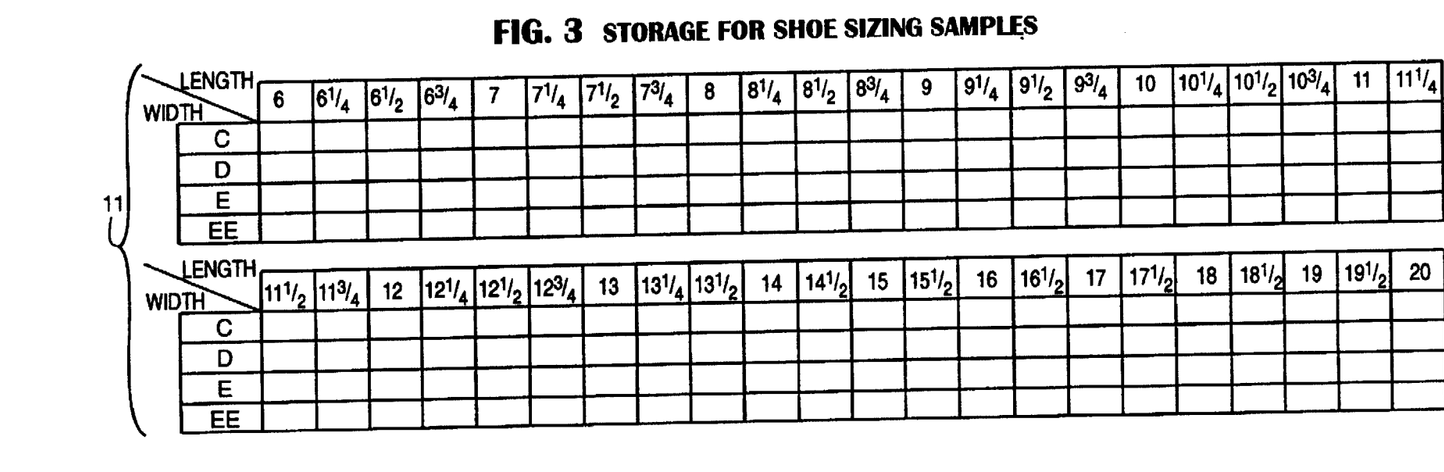
FIG. 3 is a diagrammatic side elevation view of the Storage for Shoe Sizing Samples shown in FIG. 1.

The system of the present invention allows for the re-formation of a stock shoe to a length and width more closely tailored to the wearer's foot sizes and fit preferences, based upon a fitting of the wearer to sizing sample shoes. In this connection, the sample shoes in storage 11 (and the corresponding lasts in storage 15) may, e.g., include lengths ranging from size 6 to 13½ in ¼ size ($\frac{1}{12}$") increments, lengths ranging from size 13½ to 20 in ½ size increments (⅙), and a range of widths for each length, e.g., widths C–EE (see FIGS. 3 and 4). With this particular arrangement (which is merely exemplary), the standard C width of the stock shoes shown in FIG. 2 can be re-formed to have a different width of D, E or EE, thus eliminating the need for the store to keep an inventory of stock shoes in these different widths. For length sizes between 6 and 13½, the closest standard half-size incremented stock shoe can be re-formed to the bestfitting ¼ size; for length sizes between 14 and 20, the closest full size incremented shoe can be re-formed to the best ½ size. In this manner, the wearer's foot length can be fit much closer (in this case, with half the tolerance of the conventional fitting system), without the need for the manufacturer to double its normal production, or the store to double its normal inventory. Additionally, different lengths and widths can be provided for the left and right feet in order to provide a custom fit, without the need for breaking up a matched pair of shoes.

Obviously, the illustrated length and width ranges and increments are just one possible arrangement for realizing the advantages of the present invention. In general, the invention contemplates re-formation of a stock shoe to any larger length and width, including both standard and non-standard lengths and widths. In addition, the system of the present invention can be used to introduce interior footwear shape variations not specifically described in terms of over-all length and width dimensions, e.g., arch length and height.

Figure 5:
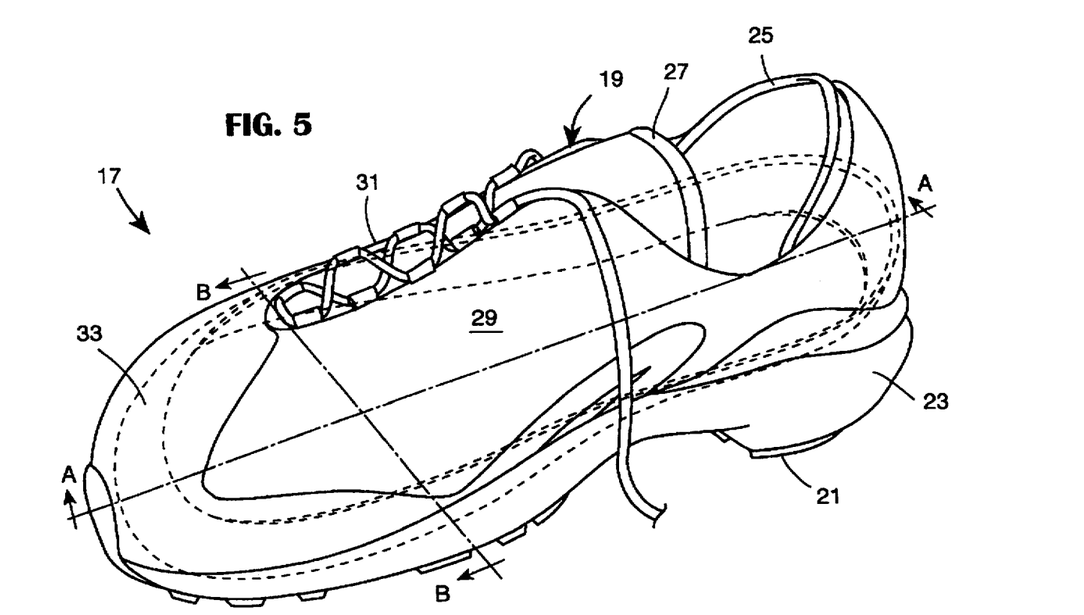
FIG. 5 is a perspective view of a shoe in accordance with the present invention, incorporating a moldable fit-strip encircling the entire base of the upper.
Figures 6, 7:
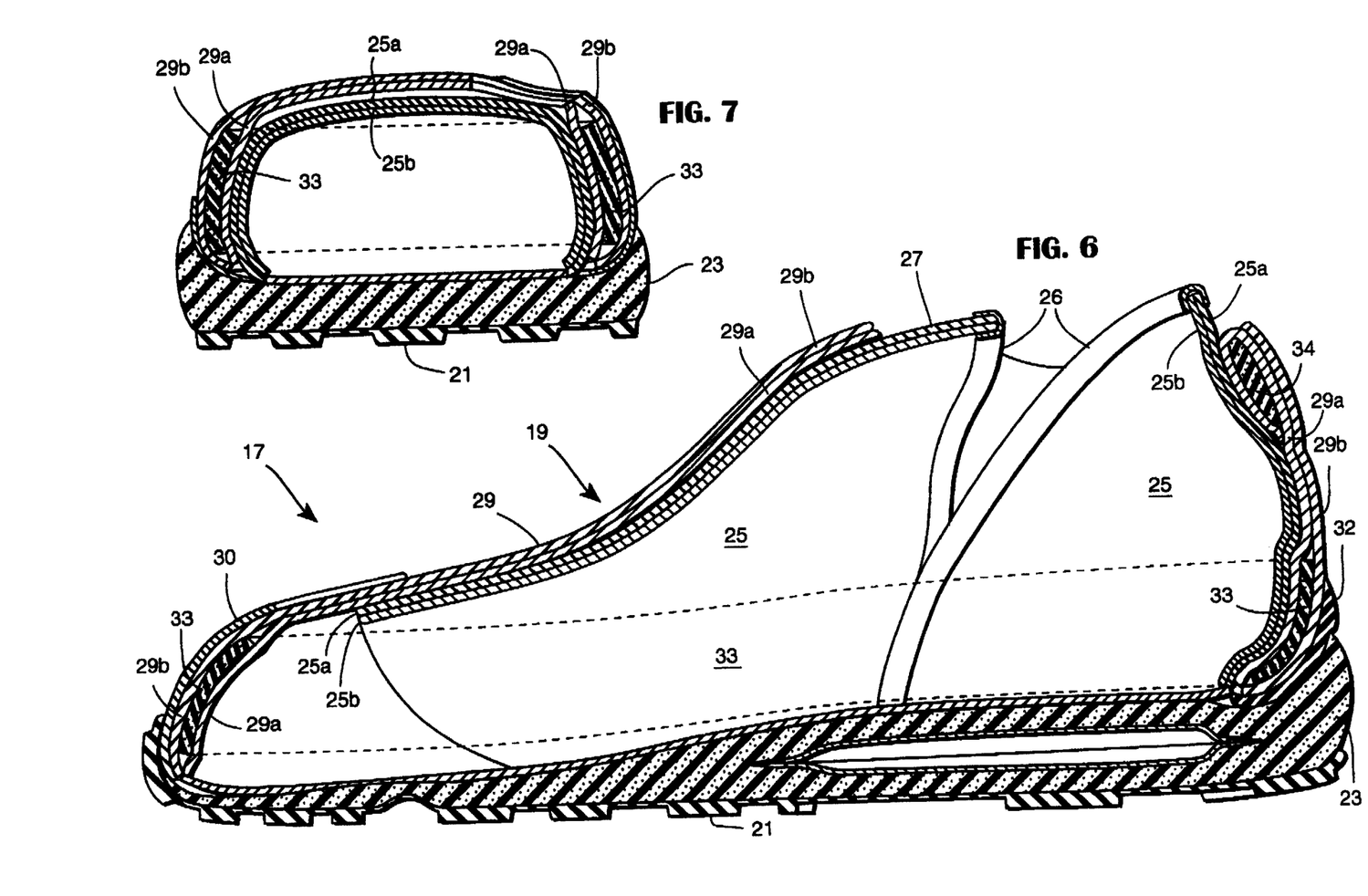
FIG. 6 is a longitudinal cross-sectional view taken on line A—A in FIG. 5.
FIG. 7 is a transverse cross-sectional view taken on line B—B in FIG. 5.

Referring now to FIGS. 5–7, illustrated is an athletic shoe 17 including a moldable fit component in accordance with the present invention. It will be understood that the invention is in no way limited to athletic shoes, but applies generally to shoes of all types, as well as other types of footwear where an optimal fit is important, including boots, e.g., dress, hiking, snow and water ski boots; and skates, e.g., ice skates and roller skates.

In the illustrated embodiment, shoe 17 comprises an upper 19 secured to a sole comprising a wear-resistant outsole 21 and a cushioning midsole 23. The upper is formed of an inner liner 25 that surrounds the foot and includes an integral tongue portion 27. An outer shell 29 surrounds liner 25 and forms an offcenter lace-type enclosure 31.

Inner liner 25 may comprise two identical fabric layers 25a,b laminated to each other back-to-back. A suitable fabric is constructed of polyester and Lycra sub-layers and is available as Guilford Spacer fabric No. 56677, from Guilford Mills of New York, N.Y. Edges of inner liner 25 are bound with strips 26 of a nylon knit two-way stretch spandex material, e.g., LYCRA.

As illustrated, outer shell 29 comprises an inner layer 29a and an outer layer 29b. Inner layer 29a may comprise, e.g., a two-way stretch LYCRA™ spandex material laminated to a thin (0.5 mm) polyurethane (PU) coating. Outer layer 29b may comprise a tensile polyester mesh, e.g., Product No. 305-2A available from Tusuen Lin Industries of Taiwan.

At the toe-end of shoe 17, outer shell 29 is covered by a man-made suede layer 30. Layer 30 may comprise, e.g., a PU suede tip material laminated to a polyester fiber/PU resin napped knit. At the lower heel-end of shoe 17, an external heel counter 32 of semi-rigid plastic material extends up from the sole and partially overlaps with outer shell 29. A suitable heel counter material is a polyester elastomer sold under the tradename HYTREL by Dupont Corp. At the upper heel-end of shoe 17, inner layer 29a of outer shell 29 wraps around, and thereby contains, a cushioning back-foam piece 34 of, e.g., polyurethane foam.

Between layers 29a,b of outer shell 29 and extending about the entire perimeter of the base of upper 19 is a fit-strip 33 of moldable material. During the manufacture of shoe 17, after layers 29a,b are cut to the proper size and shape, fit-strip 33 can be tacked in place along one of layers 29a,b with adhesive and then permanently held in position by a sleeve formed by sewing layers 29a,b together above and below strip 33. Instead of positioning strip 33 between the layers of the outer shell, strip 33 could be placed between outer shell 29 and inner liner 25, in which case suitable means, e.g., a separate sleeve, could be attached to the inner layer of outer shell 29 for maintaining proper positioning of strip 33.

Obviously, numerous other upper materials and constructions can be utilized. In this connection, the shoe components should be chosen so as to ensure that they are not inadvertently re-formed or damaged during the molding process (described below). For example, providing back-foam piece 34 as a thermoset material will avoid thermoplastic re-formation thereof during the molding process.

Preferably, the material of strip 33 is a foamed thermoplastic material having a relatively low softening temperature, e.g., low density foamed ethylene vinyl acetate (EVA). Strip 33 constitutes a moldable fit component that allows shoe 17 to be placed on a molding apparatus (to be described) and re-formed to a larger length and width. The initial thickness of strip 33, and the molding characteristics of the material thereof, will determine the range of sizes attainable by molding. In the molding process, the strip material is heated to its softening temperature and compressed to a lesser thickness. As the strip is reduced in thickness, the size of the shoe interior increases proportionately. By providing a reduction of strip thickness at the toe and heel ends of the shoe, the length of the shoe can be varied from the original stock length. Similarly, by providing a reduction of strip thickness along the lateral and medial sides of the shoe, the width of the shoe can be varied from the original stock length.

For example, strip 33 can be provided as a strip of foamed EVA having an initial uniform thickness of $\frac{4}{12}$" and an initial specific gravity of about 0.2. By reducing the thickness of the strip at opposite sides or ends of the shoe by $\frac{1}{12}$", an increase in length or width of twice that mount (⅙") is obtained. Such an increase corresponds to a half-size increase in length, and a full size increase in width. Such a reduction will cause the specific gravity of the strip (at the points of reduction) to increase to about 0.3. Similarly, a thickness reduction of the strip at opposite sides or ends of the shoe of ⅛" will increase the length or width of the shoe by ¼" (a jump of a full size in length and two sizes in width). Such a reduction will cause the specific gravity of the strip (at the points of reduction) to increase to about 0.4. The strip can be further reduced in thickness by ¼" on each side or end of the shoe in order to cause a jump of three sizes in width and/or 1½ sizes in length. At this point the specific gravity of the EVA would be increased to 0.8, and a $\frac{1}{12}$" thickness of the strip of EVA would remain.

Advantageously, foamed EVA remains a fairly resilient material throughout the above-mentioned range of reduction so that the strip will not significantly interfere with the resiliency and conformability of the upper. Moreover, the collapsibility of the cells of the foamed EVA during the molding process allows for a reduction in the thickness of the strip without spreading, i.e., without a substantial change in the length and/or width dimensions of the strip.

A variety of suitable EVA formulations are commercially available. Three preferred formulations are listed below:

1. Dupont Elvax 460, Melt Index (ASTM D1238) 2.5 dg/min, Vicar Softening Temp (ASTM D 15250) 64° C. (147° F.), 18% vinyl acetate;
2. USI Evathene 630, Melt Index 1.5, 16% VA; and
3. Exxon Excorene 328, Melt Index 3.0, 28% VA.

Other alternative thermoplastic foams are polyethylene or polyethylene ethylene vinyl acetate (P.E.E.V.A.). Combinations or formulations of thermoplastic foams with other non-thermoplastics (such as cork) are also contemplated.

With a potential increase in width of three full sizes by a reduction of strip 33 as described above, it will be readily appreciated that each of width sizes C, D, E and EE of the sample shoes in storage 11 (see FIG. 3) can be achieved from a stock shoe inventory consisting of shoes in the C width only. Obviously, an even greater range of widths can be accommodated by providing stock shoes with different starting widths, e.g., provided in four-size increments. Similarly, since a reduction of strip 33 can create a jump of 1½ sizes in length, the stock shoe inventory could be reduced by including only lengths in two-size (four half-size) increments. Alternatively, or in addition, the reduction of strip 33 can be performed so as to allow finer sizing to lengths and widths intermediate the standard size increments.

A wider range of size adjustment by molding can be attained through the use of a strip 33 having a greater starting thickness. However, greater thicknesses may tend to add noticeable bulk to the shoe upper. A thickness range of ¼" to ⅓" is preferred in order to provide a substantial range of size adjustability with minimum bulk.

Figure 8:
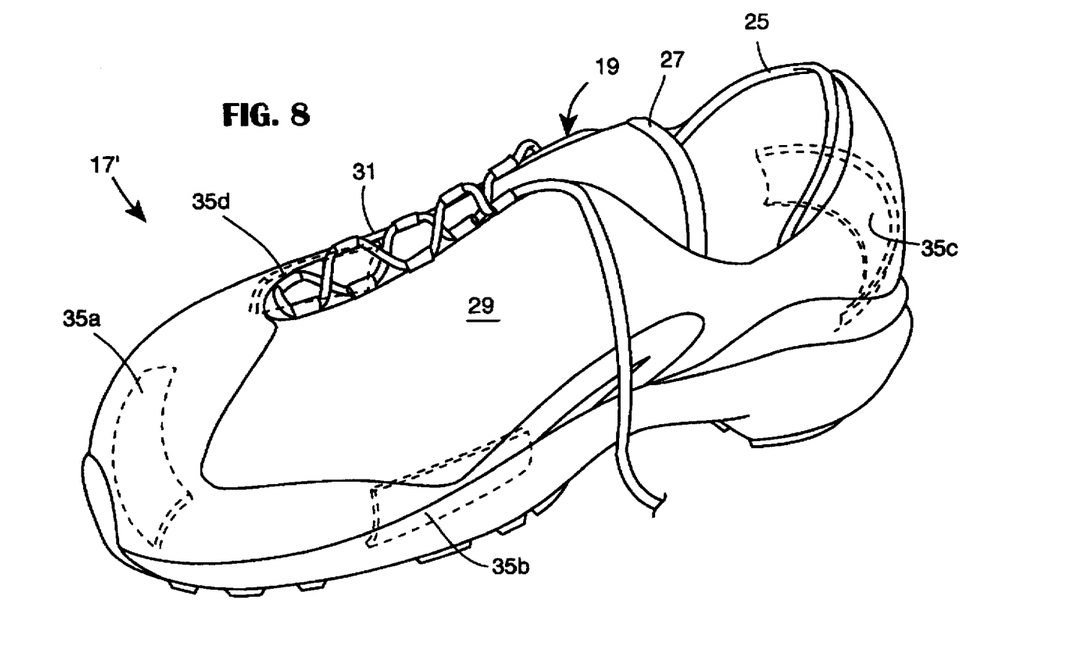
FIG. 8 is a perspective view, similar to FIG. 5, illustrating a second shoe embodiment of the present invention, wherein the fit-strip encircles less than the entire base of the upper.

As illustrated in FIG. 8, the fit-strip need not extend about the entire perimeter of the base of the upper. In this embodiment, shoe 17' has strip segments 35a, 35b, 35c and 35d that are selectively placed at the locations critical to providing the desired sizing adjustments. In this case, the strip segments are provided at opposing ends and sides of the base of the upper to allow for adjustment of shoe length and width. It will be understood that the placement of moldable fit components need not be restricted to the base of the upper. Rather, such components may be placed at any location within the shoe where size adjustment and/or compensation for foot problems may be desired.

Figure 9:
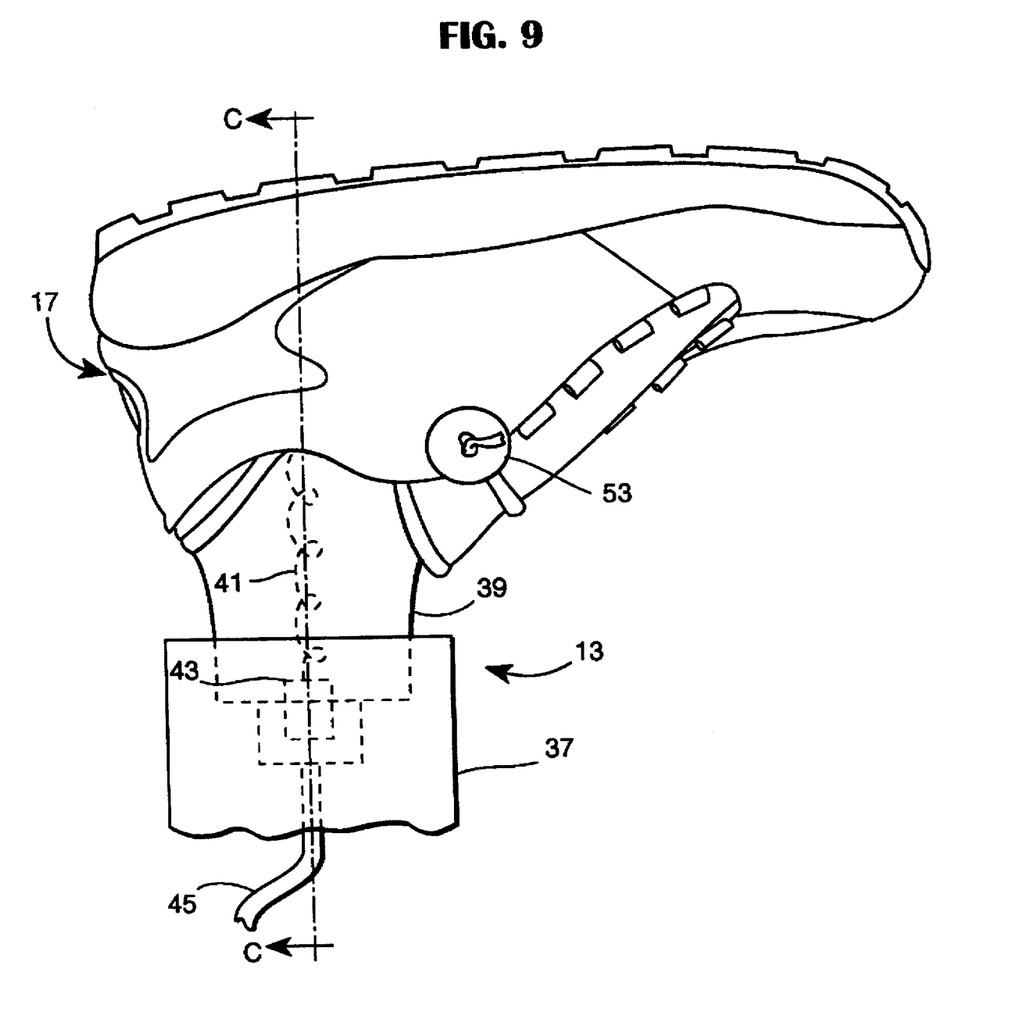
FIG. 9 is a diagrammatic side elevation view of an apparatus performing a custom molding operation on a stock shoe in accordance with the present invention.
Figures 10, 12:
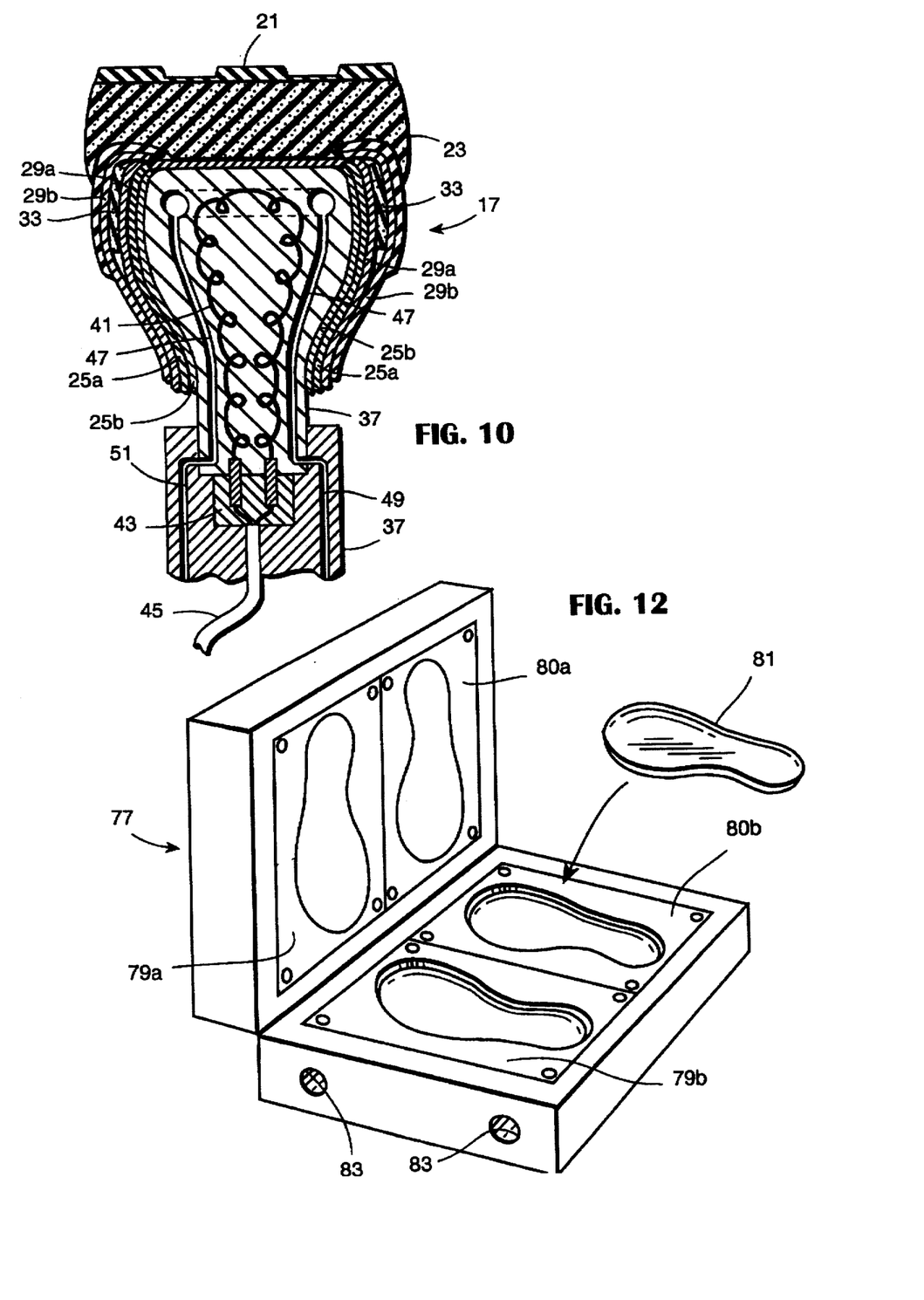
FIG. 10 is a transverse cross-sectional view taken on line C—C of FIG. 9.
FIG. 12 is a perspective view of an apparatus for performing a custom molding operation on a stock shoe insert in accordance with the invention.

Molding apparatus 13 is now described with reference to FIGS. 9 and 10. Apparatus 13 comprises a stand 37 which removably accepts and supports in an inverted position a heatable last 39 (one of the interchangeable lasts of different size stored in mold core (last) storage 15). In the illustrated embodiment, last 39 is made of a heat conductive and resistant material such as metal and has extending therein a resistance heating element 41 connected to an electrical supply via plug-type contact 43. Power is supplied to stand 37 via power cord 45.

Last 39 preferably also has internal cooling fluid ducts 47 that are placed in communication with cooling fluid source and drain lines 49, 51 extending to stand 37. The cooling fluid can be any common fluid used for cooling, such as chilled water circulated through ducts 47 once and then drained (an open system), or a recirculated refrigerant such as freon passing through a refrigeration circuit (a closed system).

In use, shoe 17 is slipped onto last 37, into the position shown, and then tightened thereon with a conventional button lace 53. Button lace 53 comprises a lace having a large button secured at one end thereof, such as by a knot. The lace is passed through the top two eyelets of the shoe and pulled tight with the large button abutting against the eyelet on one side. The lace is looped back, pulled tight and then tied to the button. Obviously, other means could be used for securing shoe 17 on last 37.

Electricity is then supplied to heating element 41 via cord 45 whereby the outer working surface of the last is heated sufficiently to soften the material of fit-strip 33 (within a range of 147° F. (64° C.)–302° F. (156° C.) for foamed EVA, with 212° F. (100° C.) being presently preferred for Dupont Elvax 460). The temperature of the heated last should be kept well below the melt (liquefying) temperature of the foamed EVA material (400° F. (204° C.) for Dupont Elvax 460), in order to avoid excessive material flow and consequent excessive collapse of the cellular foam structure.

The heat of the last is transmitted through the inner layer(s) of the upper to fit-strip 33, whereby fit-strip 33 is re-formed in accordance with the size and shape of the outer surface of the last. This, of course, causes a corresponding change in the shape and size of the shoe interior. It is believed that the tension and elastic deformation of fit-strip 33 caused by placement of last 37 within the undersized shoe interior, and the securing of button lace 53 as described above, will naturally cause fit-strip 33 to re-form during the molding process to provide a shoe interior shape and size corresponding substantially to the shape and size of last 37. Depending on the type of shoe and moldable fit component utilized, however, it may be desirable to employ additional elements for assisting the molding action, such as pads surrounding the shoe upper and exerting inward pressure on the upper to force it against the last.

The heating cycle may be followed by a cooling cycle utilizing a cooling fluid passing through cooling ducts 47 as described above. A cooling cycle utilizing a cooling fluid will advantageously cause rapid cooling so that the entire process can be completed in a matter of minutes. Alternatively, if time is not critical, the last can be allowed to cool naturally in ambient air.

Once last 37 has cooled below the softening temperature of the strip material, the strip material will quickly firm-up in its re-formed state, at which point the shoe can be removed from the last. Obviously, timed switch and signal means can be provided to initiate and terminate the heating and cooling cycles, and to signal the occurrence of these events.

The invention is not limited to thermoplastic molding using a resistance heated last. For example, re-forming of the shoe interior can be effected using a last having elements that are heated by other means such as by microwave energy or heated fluids, e.g., steam. Re-formable fit components comprising a thermoset material that is cured by heat, water, catalysts, microwave energy or light are also contemplated, as are combinations of thermoplastics and thermosets.

Nor is the invention limited to the re-formation of a fit component (like strip 33 or strip segments 35a–d) forming a relatively small portion of the shoe upper. Rather, in accordance with the present invention, all or a substantial part of the shoe upper could comprise a moldable fit component. In particular, shoes formed using the Foamposite™ shoe molding technique described in the (to be) commonly assigned application entitled "Method of Making an Article of Footwear" and listing as inventors John C. Tawney and Toren P. B. Orzeck (filed concurrently herewith; Serial No.

not yet assigned; Attorney Docket No. 5127.46539) lend themselves well to custom-fitting using the molding techniques described herein. This application is hereby incorporated by reference in its entirety.

Figure 11:
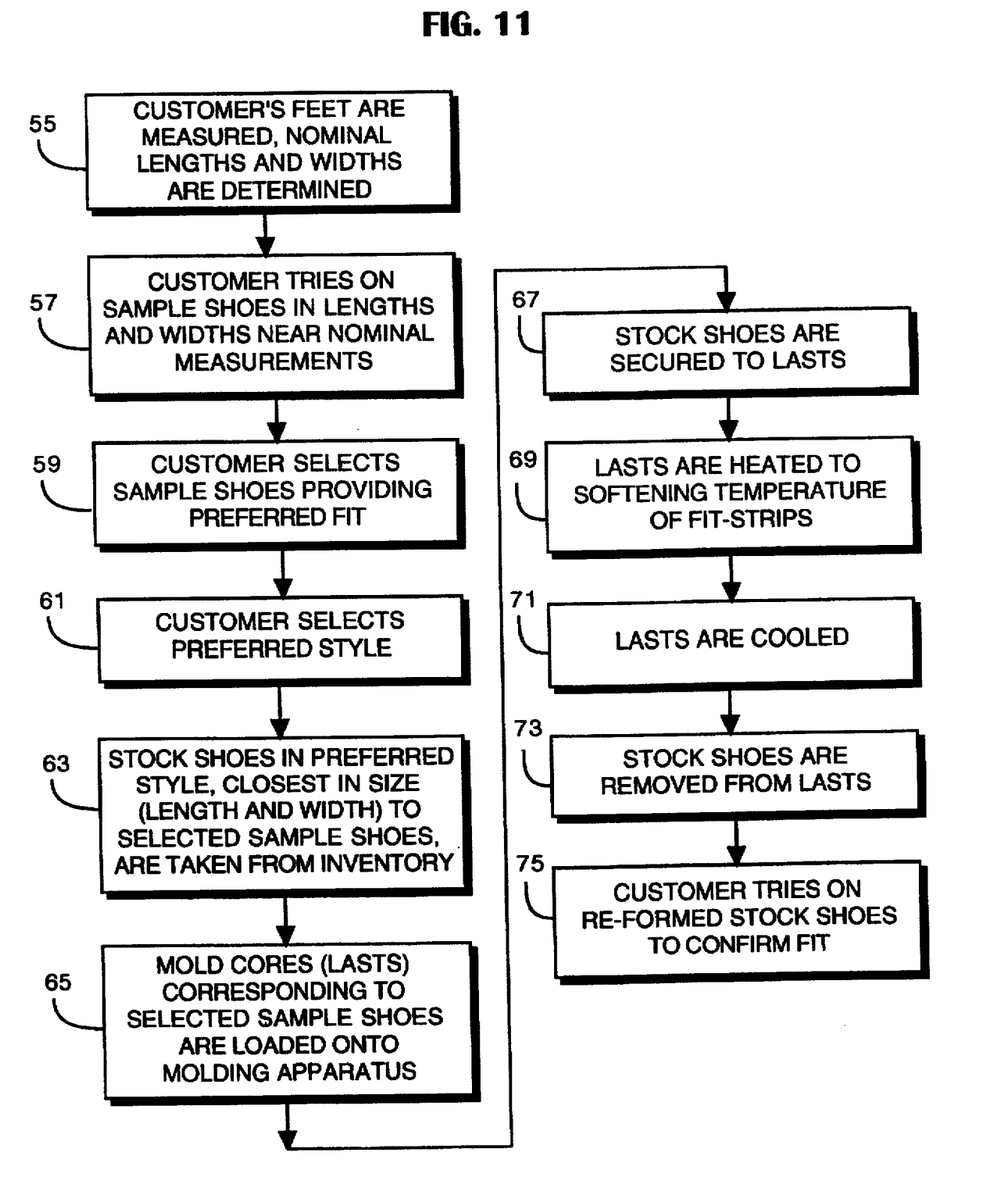
FIG. 11 is a process flow chart for a fitting method in accordance with the invention.

With reference to FIG. 11, a basic process flow in accordance with the present invention is now described. First, a customer's feet are measured and nominal foot sizes, i.e., length and width, are determined (step 55). Conventional means can be used to perform this step, such as a Brannock shoe measurement tray. Next, the customer tries on sample footwear taken from storage 11, in lengths and widths near the nominal measurements determined in step 55 (step 57). The customer then selects the sample shoe providing the preferred fit (step 59), and a desired shoe style, e.g., color and/or ornamental design (step 61). The stock shoe having the desired style, and closest in size to the selected sample shoe, is then chosen from inventory 9 (step 63); the mold core (heatable last) corresponding in size and shape to the selected sample shoe is then chosen from storage 15 and loaded onto stand 37 of molding apparatus 13 (step 65). At step 67, the stock shoes are secured on the heatable lasts, whereupon the lasts are heated to the softening temperature of the fit-strips (step 69), then cooled (step 71). Finally, the completed custom-molded shoes are removed from the lasts (step 73), and the shoes are tried-on by the customer to confirm the proper fit (step 75).

In a further embodiment, the present invention contemplates the reformation of footwear inserts separate from, rather than integral with, the footwear. FIG. 12 shows a compression molding apparatus 77 for re-forming a removable shoe insole. In this variation of the invention, the shoe store stocks a set of sample insoles having different shapes and/or sizes. For example, insoles having very-low, low, medium, high and very- high arch supports could be provided. The store also stocks a supply of molds corresponding in size and shape to each of the sample insoles, and an inventory of stock-size insoles. The sample and stock sole inserts can be formed of a variety of moldable materials. Preferably, the material is a resilient foamed thermoplastic material having a relatively low softening temperature, e.g., low density foamed EVA, as in the previous fit-strip equipped shoe embodiments.

The wearer tries-on shoes equipped with the sample insoles and chooses the insoles that provide the desired fit characteristics. Then, mold half pairs 79a,b and 80a,b corresponding to the chosen sample insoles are installed in molding apparatus 77. Stock insoles 81 (only one shown) are positioned in the respective mold cavities, apparatus 77 is closed, and a heating and compression cycle is performed to re-form the stock insoles into the shape and size of the chosen sample insoles. Although not specifically shown, it will be understood that conventional means can be provided in apparatus 77 for heating the mold halves to the softening material of the insert material. It is also preferable that means be provided for rapidly cooling the mold halves, such as cooling fluid conduits 83.

The present invention has been described in terms of preferred embodiments thereof. Other embodiments, modifications and variations within the scope and spirit of the appended claims will, given the benefit of this disclosure, occur to those having ordinary skill in the art.

I claim:

1. A footwear fitting method comprising:
   providing a plurality of sample footwear items having different sizes and/or shapes corresponding to predetermined footwear interior sizes and/or shapes;
   fitting a foot of a wearer to a selected one of said sample footwear items;
   providing a stock footwear item having a different shape and/or size than the selected one said sample footwear items; and
   re-forming said stock footwear item, without using a foot of said wearer as a mold form for said re-forming, to have a shade and size which is substantially the same as the selected one of said sample footwear items.

2. A footwear fitting method according to claim 1, wherein the stock footwear item comprises a moldable fit component, and said re-forming step is performed by contacting a working surface of a molding tool with said fit component to cause said fit component to re-form into a shape and size corresponding to the shape and size of said working surface.

3. A footwear fitting method according to claim 2, wherein said reforming step further includes heating the working surface of the molding tool.

4. A footwear fitting method according to claim 2, further comprising the step of selecting said molding tool from a plurality of molding tools corresponding in shape and size to said sample footwear items.

5. A footwear fitting method according to claim 1, wherein said sample footwear items each form a sample foot enclosure and said stock footwear item forms a stock foot enclosure, and said re-forming step re-forms said stock foot enclosure such that it has an interior shape and size which is substantially identical to the shape and size of an interior of the selected one of the sample foot enclosures.

6. A footwear fitting method according to claim 5, wherein said stock foot enclosure is, prior to re-forming, configured to provide a footwear interior that is undersized in comparison to said selected one of the sample foot enclosures.

7. A footwear fitting method according to claim 5, wherein the stock foot enclosure comprises a moldable fit component, and said re-forming step comprises heating a last and inserting the last into the stock foot enclosure to cause said fit component to re-form into a shape and size corresponding to the shape and size of said last.

8. A footwear fitting system according to claim 7, further comprising the step of selecting said last from a plurality of lasts having shapes and sizes corresponding to said sample foot enclosures.

9. A footwear fitting method according to claim 7, wherein said fit component comprises a strip of thermoplastic material extending at least part way around a perimeter of a base of the stock foot enclosure, and said re-forming step compresses at least a portion of said strip.

10. A footwear fitting method according to claim 9, wherein said thermoplastic material is a foamed thermoplastic material.

11. A footwear fitting method according to claim 10, wherein said foamed thermoplastic material is foamed ethylene vinyl acetate (EVA).

12. A footwear fitting method according to claim 10, wherein said foamed thermoplastic material has a specific gravity, before re-forming of approximately 0.2 and a specific gravity after reforming of between 0.3 and 0.8.

13. A footwear fitting method according to claim 9, wherein said strip of thermoplastic material has an initial thickness of ¼"–⅓", and a reduction of thickness of 1/12"–¼" after re-forming.

14. A footwear fitting method according to claim 1, wherein said sample footwear items and stock footwear item each comprise footwear inserts, and said re-forming step re-forms said stock footwear insert to have a shape and size substantially identical to that of the selected one of the sample footwear inserts.

15. A footwear fitting method according to claim 14, wherein the stock footwear insert comprises a moldable fit component, and said re-forming comprises placing said fit component into a mold cavity to cause said fit component to re-form into a shape and size corresponding to the shape and size of said mold cavity.

16. A footwear fitting method according to claim 15, wherein said reforming further includes heating the mold.

17. A footwear fitting method according to claim 15, wherein the moldable fit component comprises a piece of thermoplastic material.

18. A footwear fitting method according to claim 14, wherein the footwear inserts are shoe insoles.

* * * * *